(12) United States Patent
Ho et al.

(10) Patent No.: US 8,739,632 B2
(45) Date of Patent: Jun. 3, 2014

(54) PRESSURE SENSOR STRUCTURE AND ASSOCIATED METHOD OF MAKING A PRESSURE SENSOR

(75) Inventors: Shih-Shian Ho, Nashua, NH (US); Srihari Rajgopal, Westlake, OH (US); Mehran Mehregany, San Diego, CA (US)

(73) Assignee: Case Western Reserve University, Cleveland, OH (US)

( * ) Notice: Subject to any disclaimer, the term of this patent is extended or adjusted under 35 U.S.C. 154(b) by 174 days.

(21) Appl. No.: 13/355,149

(22) Filed: Jan. 20, 2012

(65) Prior Publication Data
US 2012/0204652 A1 Aug. 16, 2012

Related U.S. Application Data

(60) Provisional application No. 61/434,847, filed on Jan. 21, 2011.

(51) Int. Cl.
*G01L 9/12* (2006.01)
*G01L 9/00* (2006.01)

(52) U.S. Cl.
USPC ............... 73/724; 73/718; 257/419; 257/619

(58) Field of Classification Search
None
See application file for complete search history.

(56) References Cited

U.S. PATENT DOCUMENTS

| 5,592,007 | A  | * | 1/1997 | Leedy | 257/347 |
| 5,592,018 | A  | * | 1/1997 | Leedy | 257/619 |
| 7,550,805 | B2 | * | 6/2009 | Leedy | 257/347 |
| 7,911,012 | B2 | * | 3/2011 | Leedy | 257/419 |
| 2005/0082641 | A1 | * | 4/2005 | Leedy | 257/565 |
| 2008/0302559 | A1 | * | 12/2008 | Leedy | 174/254 |
| 2012/0133020 | A1 | * | 5/2012 | Joblot et al. | 257/532 |

\* cited by examiner

*Primary Examiner* — Andre Allen
(74) *Attorney, Agent, or Firm* — Tarolli, Sundheim, Covell & Tummino LLP

(57) ABSTRACT

A pressure sensor can include a diaphragm plate of an electrically conductive material, the diaphragm plate including substantially planar opposed first and second surfaces. A layer of a dielectric material can be provided at the first surface of the diaphragm plate along a periphery thereof such that a flexion region of the first surface is substantially free of the dielectric material. The dielectric layer can be configured to engage a fixed structure within a housing to support the flexion region as to enable deflection thereof relative to the fixed structure that changes an electrical characteristic of the pressure sensor in response to application of force at the second surface of the diaphragm plate.

21 Claims, 5 Drawing Sheets

PRESSURE SENSOR STRUCTURE AND ASSOCIATED METHOD OF MAKING A PRESSURE SENSOR

CROSS-REFERENCE TO RELATED APPLICATION

This application claims the benefit of U.S. Provisional Patent Application No. 61/434,847, filed Jan. 21, 2011, and entitled PRESSURE SENSOR AND METHOD OF MAKING SAME, the entire contents of which is incorporated herein by reference.

TECHNICAL FIELD

This disclosure relates generally to pressure sensing and, more particularly, to a pressure sensor structure and an associated method of making the pressure sensor.

BACKGROUND

Various types and configurations of pressure measurement and monitoring devices have been developed. Pressure sensors can be used for control and monitoring in thousands of everyday applications. Pressure sensors can vary drastically in technology, design, performance, application suitability and cost. A capacitive type of pressure sensor employs a diaphragm and pressure cavity to create a variable capacitor to detect strain due to applied pressure. Common technologies use metal, ceramic, and silicon diaphragms. However, these technologies are usually applied to low pressures. Additionally, many existing implementations require high packaged sensor cost and provide an effective operation over a limited operating temperature range. Existing designs can also require recalibration of the sensor after packaging to properly characterize the input response.

SUMMARY

This disclosure relates generally to pressure sensing and, more particularly, to a pressure sensor structure and an associated method of making the pressure sensor.

In one example, a pressure sensor can include a diaphragm plate of an electrically conductive material, the diaphragm plate including substantially planar opposed first and second surfaces. A layer of a dielectric material can be provided at the first surface of the diaphragm plate along a periphery thereof such that a flexion region of the first surface is substantially free of the dielectric material. The dielectric layer can be configured to engage a fixed structure within a housing to support the flexion region as to enable deflection thereof relative to the fixed structure that changes an electrical characteristic of the pressure sensor in response to application of force at the second surface of the diaphragm plate.

In another example, a sensor system can include a sensor structure. The sensor structure includes a diaphragm plate of an electrically conductive material. The sensor structure also includes backing plate comprising an electrically conductive material. The sensor structure also includes a dielectric layer between the first surface of the diaphragm plate and the backing plate. The dielectric layer is configured to support and separate a flexion region of the diaphragm plate from an adjacent surface of the backing plate to enable deflection of the flexion region relative to the adjacent surface of the backing plate. A capacitance of the sensor structure can vary as a function of an amount of the deflection of the flexion region. A sensing device can be coupled to the backing plate and a housing in which sensor structure is mounted. The sensing device can thus be configured to provide an output signal that represents pressure within the housing based on the capacitance of the sensor structure.

In yet another example, a method for making pressure sensor can include providing a diaphragm plate of an electrically conductive material, a predetermined region of the diaphragm plate defining a flexion region. A layer of dielectric material can be provided along a proximal surface of the diaphragm plate except at the flexion region which is substantially free of the dielectric material. A backing structure comprising an electrically conductive material can be mounted within a housing. The backing structure and the diaphragm plate can sandwich the layer of dielectric material within the housing in a configuration such that the layer of dielectric material supports the flexion region of the diaphragm plate to enable deflection thereof in response to pressure of fluid media provided at an inlet of the housing that is in fluid communication with a pressure-receiving distal surface of the diaphragm plate.

DETAILED DESCRIPTION

This disclosure relates a pressure sensor structure and an associated method of sensing pressure. The pressure sensor can be implemented in a simple yet robust construction, such as can be mounted in a housing (e.g., a pipe fitting). For example, the housing can include an inlet for applying pressurized fluid to the sensing structure. The sensing structure can include a diaphragm plate that is configured to deflect in response to the applied fluid. An electrical characteristic, such as impedance (e.g., capacitance) of the sensing structure can vary as a function of the deflection of the diaphragm plate. The pressure sensor can provide reliable pressure sensing in harsh operating environments, such as can include corrosive media, extreme temperatures ranges and the like.

Figure 1:
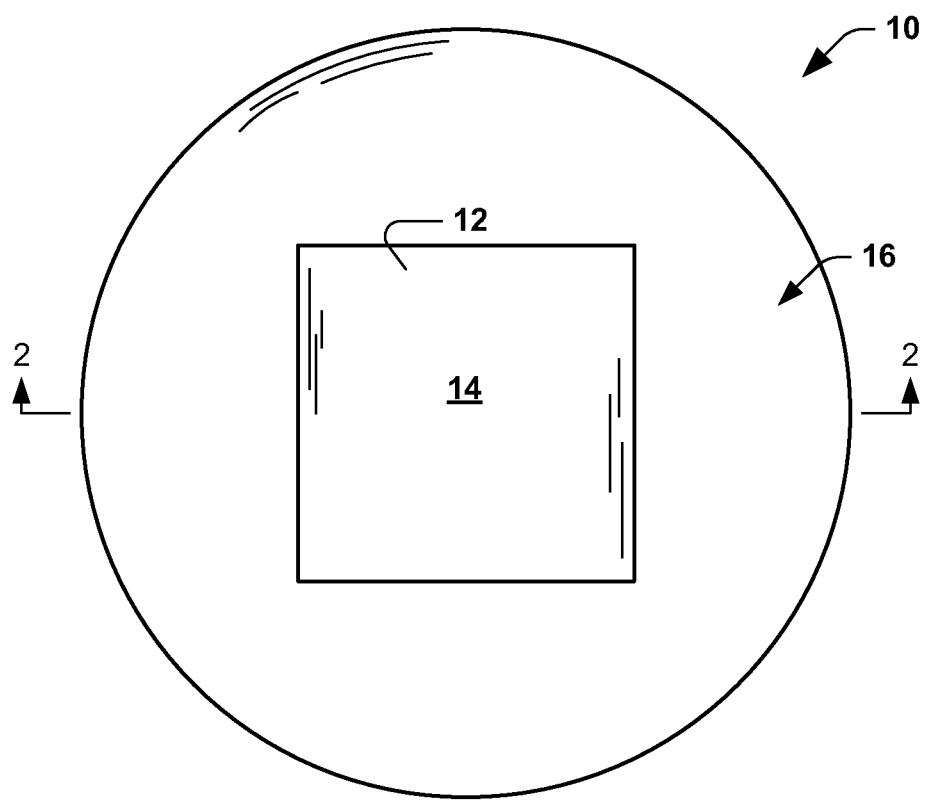
FIG. 1 depicts a top elevation of an example pressure sensor.
Figure 2:
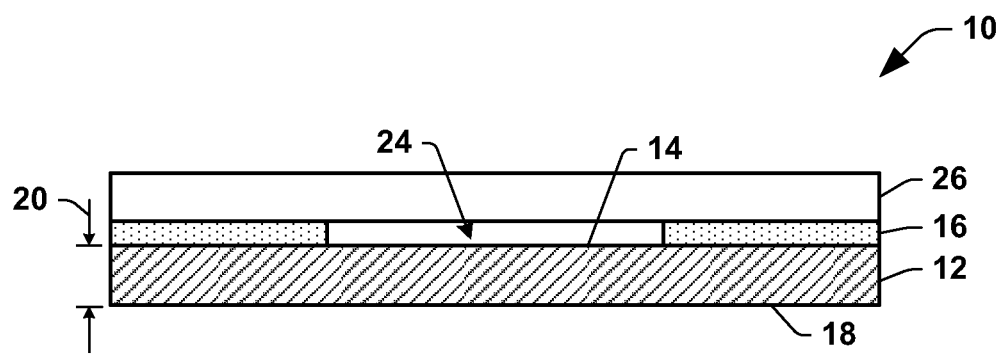
FIG. 2 depicts a cross-sectional view of the pressure sensor of FIG. 1 taken along the line of 2-2 of FIG. 1.

FIGS. 1 and 2 depict an example of a pressure sensing structure 10. The sensing structure 10 includes a diaphragm plate 12 of an electrically conductive material. For example, the electrical conductive material can be a corrosion resistant metal, such as steel or another alloy. For example, the diaphragm plate 12 can be implemented as a metal, such as an anti-corrosion alloy. An opposite surface 18 of the diaphragm plate 12 can be exposed to receive force, such as corresponding to pressure (e.g., force per unit area). The force applied at the pressure receiving surface 18 can be provided by a fluid, such as a liquid or gas.

By way of example, the diaphragm plate 12 can be implemented as stainless steel die and have a corresponding thickness indicated at 20. The thickness of the diaphragm plate 12 can be set according to the application requirements such as depending on the range of pressure to which the corresponding sensing structure 10 will be exposed. In some examples, the diaphragm plate 12 can have a thickness that is less than or equal to about 500 μm (e.g., fabricated from a 500 μm die of stainless steel or other anti-corrosion metal). In other examples, the diaphragm plate 12 can have a thickness that is less than or equal to about 250 μm (e.g., fabricated from a 250 μm die of stainless steel or other anti-corrosion metal).

The diaphragm plate 12 includes a substantially planer surface 14 onto which a layer 16 of dielectric material can be disposed. As depicted in the example of FIGS. 1 and 2, the dielectric layer 16 can be provided at the surface 14 along a periphery of the diaphragm plate 12 that circumscribes a corresponding central portion of the plate. The corresponding central portion of the first surface 14, which defines a flexion region 24 for the plate 12, is substantially free from the dielectric material.

The dielectric layer 16 can operate as a support that enables deflection of the flexion region 24 relative to a backing structure 26. That is, the backing structure 20 supports the dielectric layer relative to a housing in which the sensing structure 10 is mounted. Thus, in the example of FIGS. 1 and 2, the flexion region 24 corresponds to a central portion of the diaphragm plate 12, and the backing structure 26 (FIG. 2) is configured to support the dielectric layer within a housing so that the flexion region 24 can deflect within the open space between the surface 14 of the diaphragm plate and the adjacent surface of the backing structure 26. This compact construction affords simplicity of fabrication (e.g., reduced cost) and still provides reliable operation in harsh environments.

As a further example, the dielectric layer 16 can be implemented as an oxide layer, such as silicon oxide, which can be formed on the surface 14 of the diaphragm plate 12. The dielectric layer 16 can be applied as a thin film of an electrically insulating material to the surface of a wafer die in a deposition process. The dielectric layer 16 can include one or more layers, such as to provide a thickness ranging from nanometers to several micrometers thick (e.g., ranging from about 2 μm to about 10 μm). In some examples, the thickness is greater than the expected deflection of the diaphragm plate 12.

For example, the layer 16 can be applied to the surface 14 in a chemical vapor deposition process, such as plasma-enhanced chemical vapor deposition (PECVD). Other types of deposition processes, such as physical deposition (e.g., sputtering, pulsed laser deposition, or the like), chemical deposition (e.g., plating, chemical vapor deposition, chemical solution deposition, or the like), can also be utilized to provide the dielectric layer 16. As mentioned above, the dielectric layer 16, regardless of how it is formed, operates as support to enable deflection of the flexion region 24 of the diaphragm plate 12. In other examples, the support can be separate from diaphragm plate, such implemented as part of the backing structure 20.

The flexion region 24 that is free of the dielectric material layer 16 can be formed according to various methods. As one example, the flexion region 24 can be formed by selectively applying the dielectric layer at the periphery but not in the central portion. This can be implemented, for instance, via a patterning process in which the dielectric layer is applied to a surface of a die (e.g., via one of the thin film deposition processes disclosed herein), such as to provide a plurality of patterned regions across the surface of the die. The die can be cut to provide plural diaphragm plates, which can have the same or different geometry depending on application requirements. For example, a wire-electrical-discharge machining (WEDM) method can be utilized to cut the patterned die into the diaphragm plates, each having a desired diameter. Other approaches may be utilized to cut the die into diaphragm plates. The diameter of the diaphragm plate 12 can be commensurate with (e.g., substantially equal to or slightly less than) the housing in which the sensor structure is to be packaged.

In the example of FIGS. 1 and 2, the diaphragm plate 12 is demonstrated as having a circular geometry. However, the diaphragm plate 12 can be implemented in different geometry depending upon the expected housing in which the pressure sensing structure 10 is intended to reside. A circular geometry, for example, lends itself to being mounted in fittings, pipes or other conduits.

The patterning approach described above facilitates construction of the diaphragm die in fewer steps. However, the flexion region 24 that is free from the dielectric material can be formed according to other methods. For example, other manufacturing processes, such as etching (e.g., reactive ion etching, wet etching, plasma etching or the like) can be utilized to remove dielectric material to provide the flexion region that can deflect within the void formed by the removal of such structure. For instance, the dielectric layer 16 can be applied to an entire surface of a die and portions of the die can be removed in a subsequent removal step.

In the example of FIGS. 1 and 2, the shape of the central region 22 is demonstrated as being generally a square shape. In other examples, different shapes can be used. For instance, the central region can be implemented as circular, oval, rectangular or the like.

With a construction as disclosed herein, as pressure is applied at the surface 18, the diaphragm plate 12 can deflect relative to the backing structure 26. The deflection of the diaphragm plate results in a corresponding change of impedance. In some examples, the deflection of the diaphragm plate results in a corresponding change in capacitance. For example, the dielectric layer 16 and the corresponding volume of space between the surface 14 and the adjacent surface of the backing structure 26 (FIG. 2), may be operative to define a capacitance of the pressure sensing structure 10. The space between the surface 14 and the adjacent surface of the backing structure 26 also operates a dielectric, which can be air or another gas. Due to its compact structure of the pressure sensing structure 10, and use of stainless steel materials or other materials that are resistant to corrosion and harsh environments, an effective pressure sensing structure can be provided for various environments and range of pressures.

Figure 3:
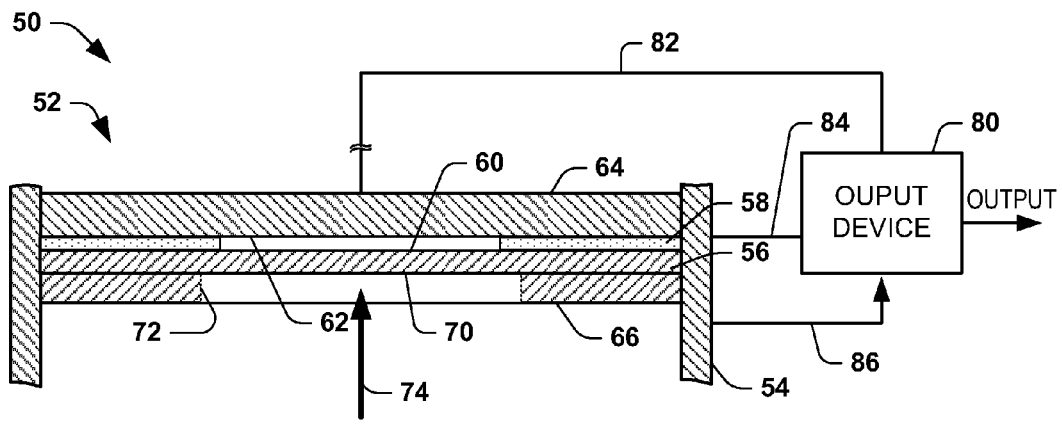
FIG. 3 depicts an example of a pressure sensing system.

By way of further example, FIG. 3 depicts an example of a pressure sensing system 50. The pressure sensing system 50 includes a pressure sensing structure 52 mounted within a housing 54. The sensing structure 52 includes a diaphragm plate 56 of an electrically conductive material, such as disclosed herein. A dielectric layer 58 is disposed on a surface 60 of the diaphragm plate 56. Similar to as described in FIG. 2, a flexion region indicated at 62 at central portion of the diaphragm plate 56 is free from dielectric material to provide a corresponding volume of space. The sensing structure 52 provides a pressure transducer to convert mechanical energy in the form of force to a corresponding electrical signal that represents the pressure. In some examples, the housing 54 (e.g., a tube fitting) can be integral to the sensing structure 52, operating as both packaging that contains the sensing structure and forming part of the sensing structure.

A backing structure 64 is fixed within the housing 54. The backing structure 64 engages the dielectric layer 58 such that the dielectric layer 58 forms support for the lateral peripheral portions of the diaphragm plate 56 as to allow for deflection and deformation of the flexion region 62. That is, the dielectric layer 58 provides at least a substantial portion of the structural support that enables the deflection of the flexion region 62 relative to the backing structure 64 and the dielectric layer.

In the example of FIG. 3, a press plate 66 engages the opposite surface 70 of the diaphragm plate 56. The press plate 66 also includes an aperture, indicated at 72, formed axially through the plate. The aperture 72 provides a path through which fluid within the housing 54 can transmit force directly onto the surface 70 of the diaphragm plate 56. The application of force corresponding to pressure within the housing 54 is demonstrated by an arrow at 74. The force 74 applied by the pressure of the fluid within the housing 54 thus can cause the diaphragm plate 56 to deflect axially relative to the backing structure 64 in response to the force 74. The amount of deflection thus can vary depending upon the amount of force applied by fluid pressure within the housing 54. The deflection of the diaphragm plate 56 can be detected by monitoring a corresponding electrical characteristic of the sensing structure 52.

The sensing system 50 also includes an output device 80 that is electrically coupled to the pressure sensing structure 52. The output device 80 can include electronics (e.g., circuitry, such as amplifiers, converters, drivers, a processor, memory or the like) configured to provide an output that is indicative of the pressure based on monitored electrical characteristics of the sensing structure 52. The electrical characteristics can include impedance, such as capacitance, resistance and/or inductance. For instance, the absence of deflection of the diaphragm plate 56 can be calibrated to correspond to a zero pressure condition. The output device 80 can further be calibrated to provide an output signal that represents pressure based on the measured electrical characteristic, which varies as a function of the amount of deflection of the diaphragm plate 56.

As one example, the output device 80 can be electrically coupled to the electrically conductive backing plate 64 via connection 82 and to the housing 54 via another connection 84. In this example, the diaphragm plate 56 is electrically connected and grounded to the housing 54. The output device 80 can be utilized to apply a positive bias voltage (e.g., about 5 V) to the backing structure 64 via the lead 82. The output device 80 can in turn measure a voltage potential between the package housing 54 and the backing structure 64 via connections 82 and 84. The output device 80 can be configured to convert the measured voltage potential between the leads 82 and 84 to a corresponding capacitance value, which varies based on the deflection of the diaphragm plate 56. That is since the surface area of the plates 56 and 64 is known and the dielectric constants of the dielectric layer 58 and the air in the space at the flexion region 62 are known, the capacitance can be computed from the measured voltage potential. The capacitance value determined from the voltage potential between 82 and 84 further can be converted to a corresponding pressure value. The voltage (e.g., or capacitance) to pressure conversion can be determined empirically, such as by monitoring the capacitance over a range of pressures and comparing the capacitance to a reference pressure gauge that may be connected to a sensor system during testing. The output device 80, for example, can implement a look up table (e.g., in memory) that is programmed to map capacitance (or another electrical characteristic) to pressure. Alternatively, the output device 80 can be programmed to implement a mathematical function to convert the measured electrical characteristic to pressure. The output device 80 can provide the output as an analog or digital signal that represents the sensed pressure.

In some examples, the output device 80 further can be configured to compensate the output pressure based upon temperature of the system 50. For example, it has been determined that the capacitance measured by the output device 80 can vary over a range of different temperature ranges. Accordingly, the output device 80 may also monitor a temperature of the housing, indicated schematically at 86. The output device 80 can employ the monitored temperature 86 to compensate the pressure as a function of the temperature. The temperature input 86 can be sensed by an external sensor that is attached to the housing 54, for example. Alternatively, the temperature sensing can be implemented by circuitry that is part of the output device 80. The output device 80 thus provides an output that indicates the pressure. Thus, the sensing system 50 employs a simple, yet robust, implementation of a pressure sensing structure 52 capable of withstanding pressures of up to or greater than about 1,000 psi in both benign and corrosive media over a range of temperature. Where temperature is generally fixed during operations, the temperature can be utilized for initial and periodic calibration.

Figure 4:
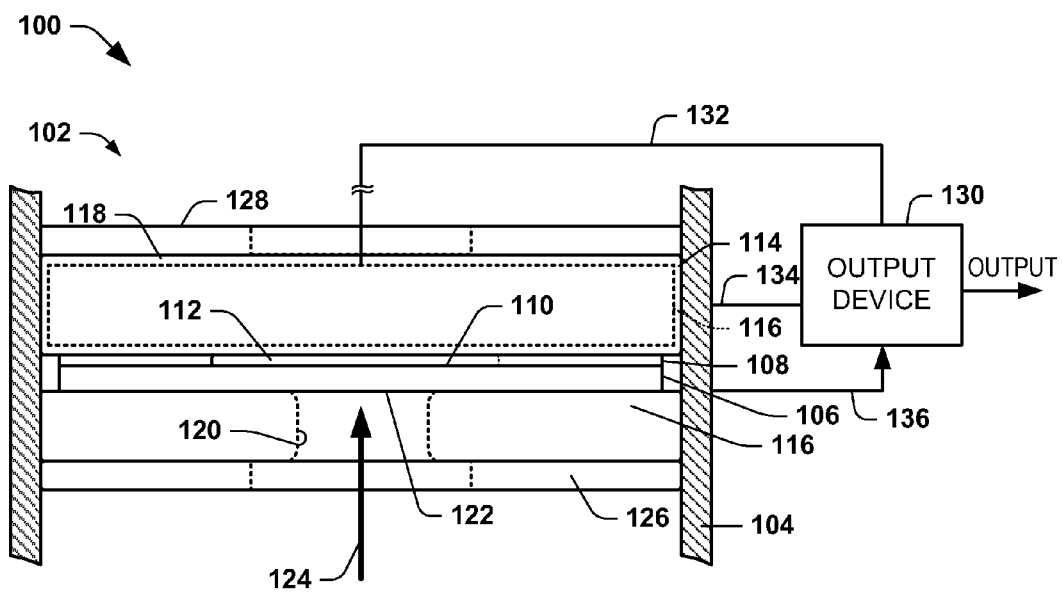
FIG. 4 depicts another example of pressure sensing system.

FIG. 4 depicts an example of another sensor system 100 that can be implemented. The sensor system 100 includes a sensing structure 102 that is mounted within a housing 104. Similar to the example of FIG. 3, the sensing structure 102 provides a pressure transducer that is configured to convert a mechanical property into electrically property that represents pressure. In the example of FIG. 4, the sensing structure 102 includes a diaphragm plate 106 of an electrically conductive material such as a metal (e.g., stainless steel). A layer 108 of a dielectric material is disposed on a corresponding surface 110 of the diaphragm plate 106. The dielectric material is applied to the surface 110 along at least two peripheral portions that are spaced apart by a central surface region that is substantially free of the dielectric material. As used herein, substantially free of dielectric material means that it is intended that the dielectric material be removed; however trace amounts may remain such that an empty volume of space between the flexion region 112 and the adjacent surface of the backing plate 114 is formed. As disclosed herein, such space can be dimensioned with a depth that is sufficient to accommodate deflection of diaphragm plate 106 for expected pressure ranges.

The layer 108 of the dielectric material can correspond to an oxide layer (e.g., an $SiO_2$ insulating film) that is deposited on the surface 110, for example. The arrangement of the dielectric layer 108 can be similar to that shown in FIG. 1 defining a peripheral portion and a corresponding central flexion region that is free of the dielectric material. The shape of the central region can be square, rectangular, circular or other shapes.

In the example of FIG. 4, the diaphragm plate 106 is sandwiched between a backing plate 114 and a press plate 116. In this way, the backing plate 114 and press plate 116 can hold the diaphragm plate 106 in a desired fixed position relative to the housing 104. As an example, the housing 104 can be implemented as a tube fitting that contains the sensing structure 102 and includes additional hardware items (e.g., gaskets) to maintain the sensing structure in a fixed position therein to monitor pressure received at an inlet (not shown) of the housing 104.

As an example, the backing plate 114 can include an electrically conductive plate 116 over which a corresponding dielectric or insulating layer has been applied. For example, the dielectric layer of material 118 can be applied over its opposed planar surfaces as well as over its sidewall surface. The dielectric material for the electrically conductive backing plate 116 can be the same dielectric layer as is applied to the surface 110 of the diaphragm plate 106. Alternatively, different dielectric materials (having known dielectric constants) can be utilized. The dielectric layer 118 thus can electrically insulate the plate 116 from the housing 104 and the fluid media within the housing. As an example, the backing plate 116 can be formed of stainless steel, such as the same (or different) material that is utilized to form the diaphragm plate 106. As another example, the backing plate 116 can be formed of tungsten carbide or another material that is stiffer (e.g., at least twice as stiff) as the material used for the diaphragm plate 106. Other electrically conductive materials could be utilized for the electrically conductive backing plate 116.

The press plate 116 can include an aperture 120 that is axially aligned with the flexion region of the diaphragm plate 106, which is free from the dielectric material. The aperture 120 thus provides a path through which fluid can flow and exert pressure on the exposed surface 122 of the diaphragm plate 106. In the example of FIG. 4, the aperture 120 has a diameter that is less than the cross-sectional dimension of the flexion region 112 that is free from the dielectric layer material 108. In other examples, the aperture 120 can have a diameter that is commensurate with or even greater than the cross-sectional dimension of the flexion region 112.

The sensing structure 102 can be utilized within a fitting that can be attached to a source via a pressure inlet to receive the pressurized fluid that applies force, indicated at 124, to the surface 122 of the diaphragm plate 106. In such a fitting, additional gaskets and other corresponding structures can be implemented within the housing 104 and utilized to package the sensor structure 102 therein. For example, gaskets 126 and 128 can be applied at opposite ends of the sensing structure 102 to facilitate mounting the sensing structure within the housing. In the example of FIG. 4, the gaskets 126 and 128 can be implemented of stainless steel (or other corrosion resistant alloy) within the housing 104. The gasket 126 further can include an aperture to facilitate the free flow of fluid into the aperture 120 and into engagement with the diaphragm plate 106.

The sensing system also includes an output device 130 that is electrically coupled to the pressure sensing structure 102. The output device 130 can include electronics configured to provide an output indicative of the pressure based on one or more monitored electrical characteristics of the sensing structure 102. For example, the electrical characteristic can include impedance, such as capacitance as well as other types of impedance (e.g., resistance, inductance), which can individually or collectively be employed to ascertain pressure. The output device 130 can further be calibrated to provide an output signal that represents a range of pressure measurements based on the measured electrical characteristics that vary as a function of the deflection of the diaphragm plate 106.

Similar to the example of FIG. 3, the output device 130 can be coupled to the electrically conductive backing plate 116 via connection 132 and to the housing 104 via another connection 134. Different numbers of leads can be utilized depending on the electrical characteristics being monitored. In one example, a signal generator in the output device 130 can be utilized to apply a positive bias voltage (e.g., about 5 V) to the backing plate 116 via connection 132. Other types of AC and or DC signals can be provided depending on the electrical characteristics (e.g., impedance) being monitored.

The output device 130 can measure a voltage potential via connections 132 and 134, and convert the measured potential to a corresponding capacitance value such as disclosed herein. The capacitance value can be converted to a corresponding pressure value such as disclosed herein (e.g., via look up table or calculation). In some examples, the output device 130 further can be configured to compensate the output pressure based on temperature of the housing 104, demonstrated at 136. The output device 130 can provide the output as an analog or digital signal that represents the sensed pressure.

Figure 6:
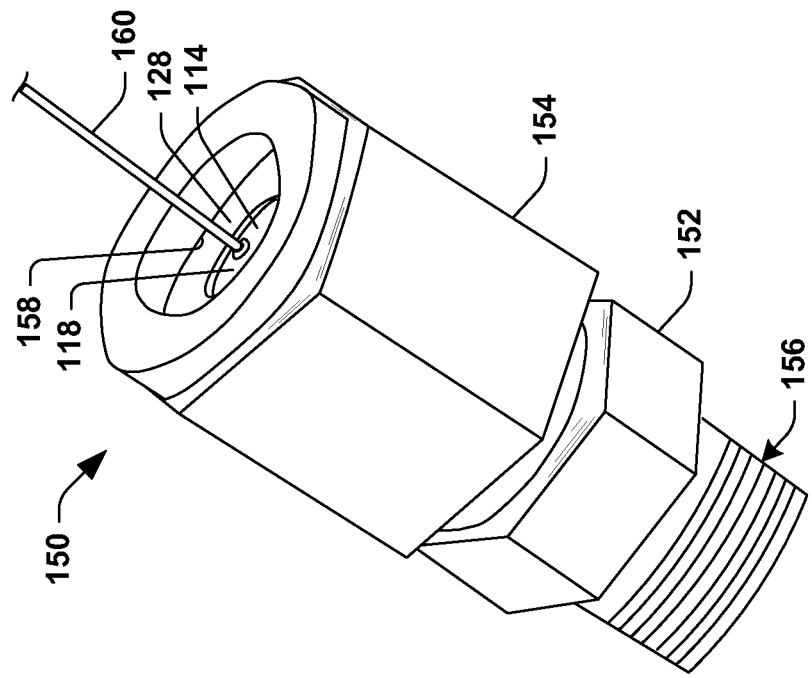
FIG. 6 depicts an example of a pressure sensor housing in which a pressure sensing structure can be mounted.
Figure 5:
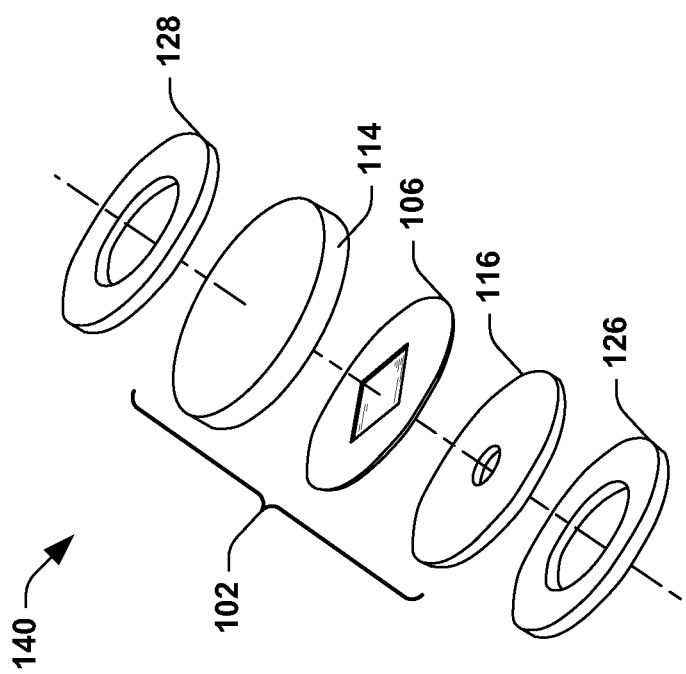
FIG. 5 depicts an exploded view of an example of a pressure sensor.

FIGS. 5 and 6 are provided to demonstrate an example construction for a pressure sensor 140 that can be implemented within a corresponding housing, such as a pipe fitting. FIG. 5 depicts an assembly view of the pressure sensor 140. The pressure sensor 140 can include the sensing structure 102 shown and described within respect to FIG. 4. Thus, the sensing structure 102 includes an axial arrangement of components in an exploded view in which the diaphragm plate 106 is disposed between the backing plate 114 and the corresponding press plate 116. The corresponding sensing structure 102 can also be sandwiched between gaskets or other structures, such as including gaskets 126 and 128.

FIG. 6 demonstrates an example of a fully assembled sensor mounted within a corresponding fitting 150, such as a pipe fitting. The fitting 150 can include a tube fitting connecting portion 152 and a corresponding female connector portion 154, such as comprising a nut. The tube connecting portion can be threaded into the female connector portion 154. The sensing structure 102 and gaskets 126 and 128 from FIG. 5 thus can be mounted within the female connector portion 154. For instance, the tube fitting connector 152 can be threaded into the female connector portion 154 such that a proximal end of the tube fitting connector urges the pressure sensor 140 into engagement with an end wall 158 (e.g., a shoulder portion) of the female connector portion. As mentioned above, the fitting 150 is an integral part of the compact sensing structure 102 that is mounted therein.

The tube fitting connector portion 152 can also include a distal end connector 156 that is configured to attach the fitting 150 to additional structure such as a pipe, tank or other structure. In the example of FIG. 6, the distal end connector 156 is threaded although types of connectors (e.g., snap fittings, friction fittings or the like) can be utilized. Also depicted in FIG. 6 is an insulated wire 160 that is electrically connected to the backing plate 114. For example, a portion of the insulating layer (e.g., an oxide, such as $SiO_2$) 118 can be removed physically from a central portion of the exposed surface of the backing plate 114. The electrical wire can be connected (e.g., via solder or an adhesive) to the exposed central portion of the backing plate 116 that is free of the insulating layer 118. Similar to that disclosed in relation to FIG. 4, the wire 160 can be utilized to provide a positive bias to the circuitry. A negative connection can be attached to the housing, such as to either the tube fitting connection portion 152 or the female connector portion 154.

Figure 7:
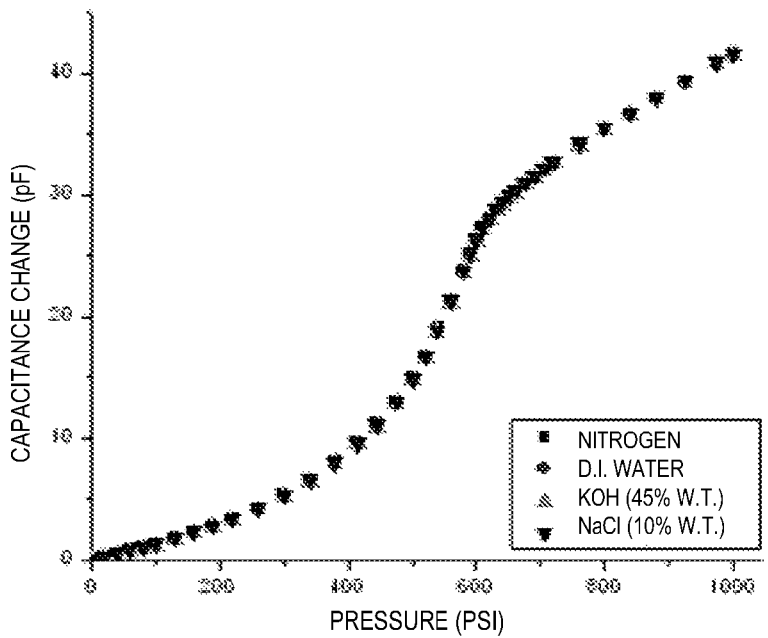
FIG. 7 is a graph demonstrating an example of capacitance plotted as a function of pressure that can be provided by a pressure sensor.

FIG. 7 depicts a graph 200 of capacitance change plotted as a function of pressure for, demonstrating an example mapping of capacitance to pressure that can be utilized by an output device (e.g., output devices 80 or 130 of FIG. 3 or 4, respectively). In the example of FIG. 7, the capacitance is demonstrated over a pressure range that is steadily increased from 0 to 1000 PSI for a plurality of different media at room temperature. The media demonstrated include nitrogen, deionized water, a potassium hydroxide (KOH) solution and a sodium chloride (NaCl) solution, to which a sensor as disclosed herein (e.g., sensing structure 52, 102) has been exposed. As shown, the graph 200 demonstrates substantially uniform capacitance for the different fluid media over the range of pressures, regardless of the pressurized fluid media. Information similar to the graph of FIG. 7 can be utilized to configure an output device (e.g., output devices 80 or 130 of FIG. 3 or 4, respectively) to convert the corresponding electrical measurement to and provide a corresponding pressure output. The graph 200 demonstrates repeatability errors of less than 5% for pressure ranges 0-380 psi and 660-1,000 psi).

Figure 8:
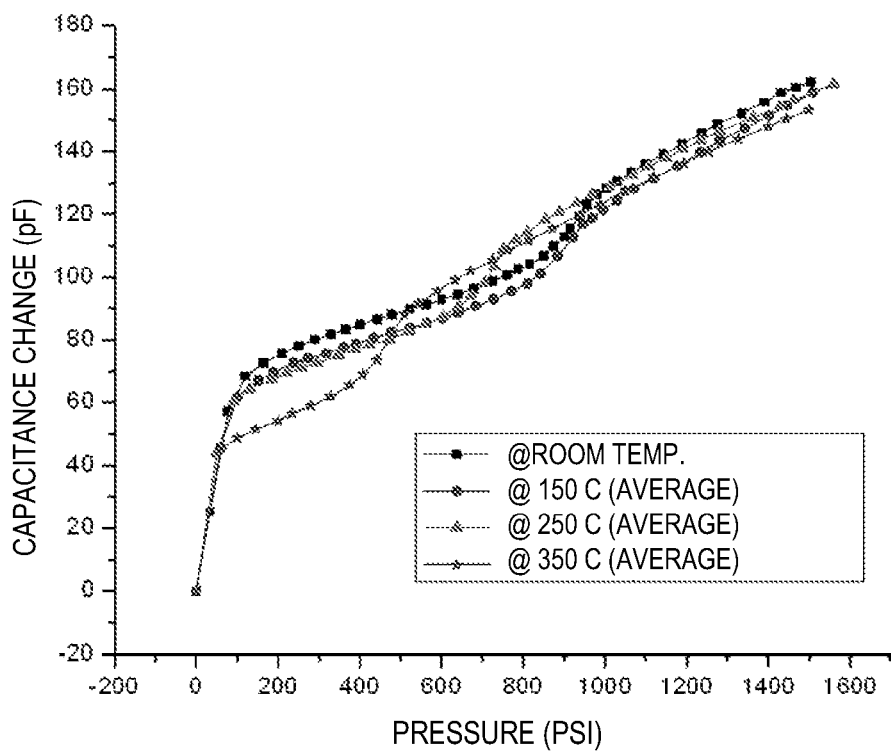
FIG. 8 is a graph demonstrating capacitance as a function of pressure for different temperatures.

FIG. 8 demonstrates an example graph 210 of capacitance change as a function of pressure for a plurality of different temperatures over a pressure range from 0 to about 1500 PSI. The graph of FIG. 8 demonstrates some variations in capacitance verses pressure at different temperatures. Thus, if a temperature or a temperature range is known a priori for a given sensing application, the output device (e.g., output devices 80 or 130 of FIG. 3 or 4, respectively) can be configured a priori accordingly to maintain accuracy over the given temperature range. In other examples, if the temperature range may vary or be unknown, a corresponding temperature sensor can be utilized to provide a temperature signal. In this way the output device (e.g., output devices 80 or 130 of FIG. 3 or 4, respectively) can implement temperature compensation to adjust the electrical characteristic (e.g., impedance, such as capacitance, voltage and/or resulting pressure values) that may be monitored by the output device.

Figure 9:
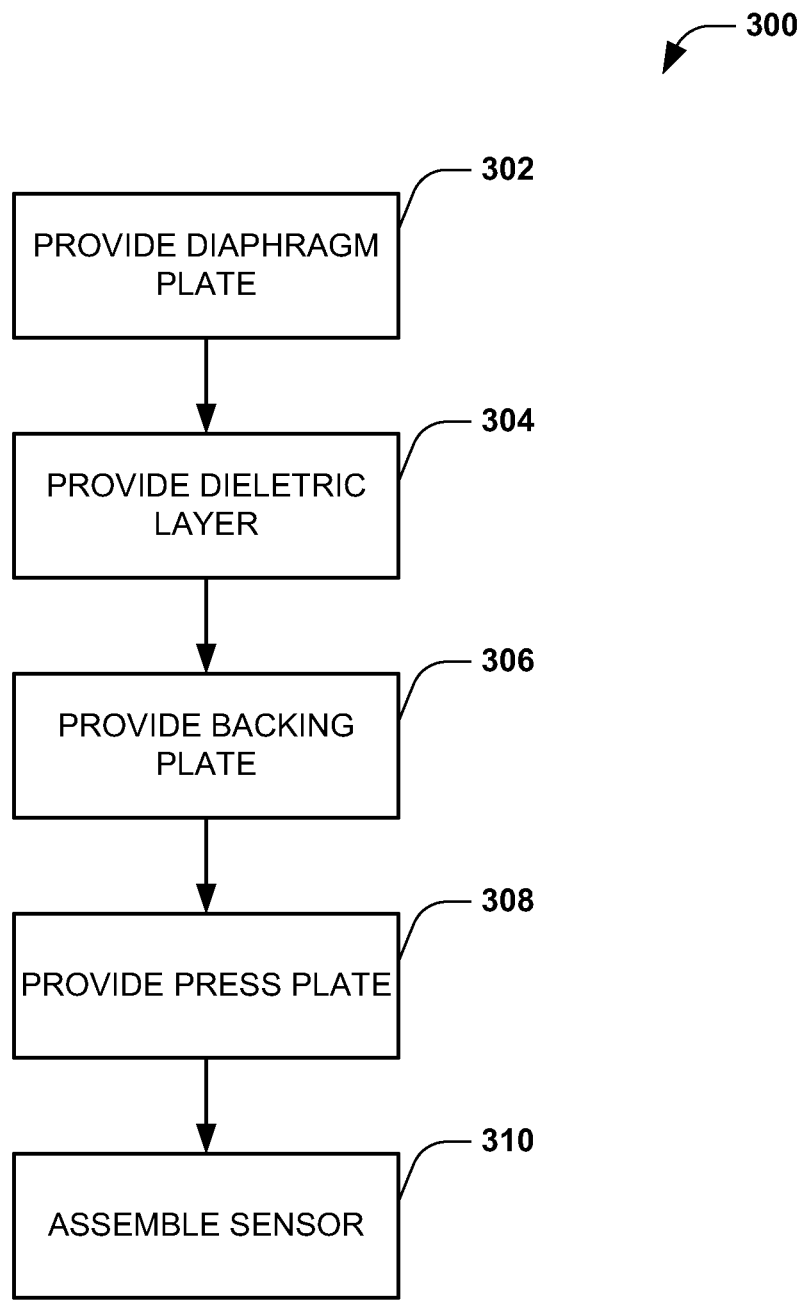
FIG. 9 is a flow diagram depicting an example of a method for sensing pressure.

In view of the foregoing structural and functional features described above, an example method will be better appreciated with reference to FIG. 9. In some examples, the pressure sensor can be mounted within the housing prior to shipment or, alternatively, the pressure components can be sent separately from the housing and assembled by a user. In either case, the pressure sensor can be made according to the example method 300 demonstrated in FIG. 9. While, for purposes of simplicity of explanation, the method is shown and described as executing serially, it is to be understood and appreciated that the method is not limited by the illustrated order, as parts of the method could occur in different orders and/or concurrently from that shown and described herein.

The method 300 of FIG. 9 begins at 302 in which a diaphragm plate (e.g., the plate 12 of FIG. 2, the plate 56 of FIG. 3 or the plate 106 of FIG. 4) can be provided. The diaphragm plate can be formed of electrically conductive material. In some examples where the sensor is likely to be exposed to harsh environment, the diaphragm plate can be made of an anti-corrosion alloy, such stainless steel.

At 304, a layer of dielectric material is provided. In one example, the dielectric layer can be formed on a surface of the diaphragm plate. Alternatively, it can be formed on the backing plate or on both plates. The dielectric layer (e.g., $SiO_2$) can be applied, for example, via PECVD.

As a further example, the deposition can be patterned onto a surface of a die having a desired thickness. The die can be cut to provide a plurality of corresponding diaphragm plates of the same or different dimensions, such as can be utilized for different size housings that may vary according to application requirements. For example, the deposition and patterning of the dielectric material can be applied to a four inch diameter, 250 micron thick stainless steel wafer die. This can be done via patterning an application of the dielectric material through a mask, for example, to maintain a corresponding region (e.g., the flexion region) of respective dies free from the dielectric material. Alternatively, the free regions can be formed via an etching or other material removal processes.

At 306, a corresponding backing plate (e.g., the backing structure 26 of FIG. 2, the plate 64 of FIG. 3 or the plate 114 of FIG. 4) can be provided. The backing plate can be applied to the dielectric layer of the diaphragm plate. The backing plate can include a layer of dielectric material on its opposing planer surfaces, which may be patterned or unpatterned (e.g., covering the entire surface thereof).

At 308, another plate (e.g., the press plate 116 of FIG. 4) can be provided at the opposite, pressure receiving surface of the diaphragm plate. For instance, the plate provided at 308 and the backing plate 306 can sandwich the diaphragm plate to provide a sensing structure (e.g., the sensing structure 102 of FIG. 4). At 310, the corresponding structure can be assembled within a housing such as a fitting. Such sandwiching of the various plates within the housing operates to fix the diaphragm plate in a configuration in which peripheral portions of the dielectric layer operate to support the flexion region of the diaphragm plate. As a result of such support, the flexion region can axially deflection relative to the backing plate, which is fixed with respect to the housing, in response to force applied at the inlet surface of the diaphragm plate.

The assembly at 310 can also include making appropriate electrical connections, such as may include one or more electrical connections. The connections can be made to the structure to facilitate sensing of the electrical characteristics (e.g., capacitance or other impedance characteristics) which vary as a function of the pressure provided at the inlet portion of the housing. The number and types of connections can vary depending on the type of sensing being implemented. The resulting pressure sensor can provide reliable pressure sensing in harsh operating environments, such as can include corrosive media, extreme temperatures ranges and the like.

Where the disclosure or claims recite "a," "an," "a first," or "another" element, or the equivalent thereof, it should be interpreted to include one or more than one such element, neither requiring nor excluding two or more such elements. Furthermore, what have been described above are examples. It is, of course, not possible to describe every conceivable combination of components or methods, but one of ordinary skill in the art will recognize that many further combinations and permutations are possible. Accordingly, the invention is intended to embrace all such alterations, modifications, and variations that fall within the scope of this application, including the appended claims.

What is claimed is:

1. A pressure sensor, comprising:
   a diaphragm plate of an electrically conductive material, the diaphragm plate including substantially planar opposed first and second surfaces; and
   a layer of a dielectric material at the first surface of the diaphragm plate along a periphery thereof such that a flexion region of the first surface is substantially free of the dielectric material, the dielectric layer being configured to engage a fixed structure within a housing to support the flexion region as to enable deflection thereof relative to the fixed structure that changes an electrical characteristic of the pressure sensor in response to application of force at the second surface of the diaphragm plate.

2. The sensor of claim 1, further comprising a backing structure, corresponding to the fixed structure, which comprises a substantially planar surface that engages the dielectric layer and sandwiches the dielectric layer between the diaphragm plate and the backing structure.

3. The sensor of claim 2, wherein the backing structure comprises a backing plate of an electrically conductive material having at least one substantially planar surface that engages the dielectric layer, the deflection of the flexion region of the diaphragm plate relative to the backing plate provides a corresponding change in the electrical characteristic of the pressure sensor that varies as a function of the force applied at the second surface of the diaphragm plate.

4. The sensor of claim 3, wherein the backing plate comprises one of stainless steel and tungsten carbide.

5. The sensor of claim 3, wherein the backing plate further comprises an insulating layer over the at least one substantially planar surface thereof.

6. The sensor of claim 3, further comprising an electrical connector electrically connected with the backing plate.

7. The sensor of claim 6, further comprising a sensing device configured to apply a potential to the backing plate via the electrical connector and to provide an output indicative of pressure based on the electrical characteristic of the pressure sensor.

8. The sensor of claim 7, wherein the electrical characteristic comprises a capacitance between the backing plate and the diaphragm plate, the capacitance changing in response to the force applied at the second surface of the diaphragm plate.

9. The sensor of claim 3, further comprising a press plate at the second surface of the diaphragm plate, the press plate including an aperture extending therethrough configured to provide a path for fluid media to apply the force at the second surface of the diaphragm plate at the flexion region of the diaphragm plate.

10. The sensor of claim 9, wherein the diaphragm plate, the backing plate and the press plate are mounted within a tubular housing of an electrically conductive material to which the diaphragm plate is electrically coupled.

11. The sensor of claim 10, wherein the tubular housing comprises a pipe fitting.

12. The sensor of claim 1, further comprising a press plate at the second surface of the diaphragm plate, the press plate including an aperture extending therethrough configured to provide a path for fluid to apply the force at the second surface of the diaphragm plate in the flexion region of the diaphragm plate.

13. The sensor of claim 12, wherein the press plate comprises a corrosion resistant metal alloy.

14. The sensor of claim 1, wherein the diaphragm plate comprises a corrosion resistant metal.

15. The sensor of claim 14, wherein the diaphragm plate comprises stainless steel.

16. A sensor system, comprising:
a sensor structure comprising:
a diaphragm plate of an electrically conductive material, the diaphragm plate including substantially planar opposed first and second surfaces; and
a backing plate comprising an electrically conductive material;
a dielectric layer between the first surface of the diaphragm plate and the backing plate, the dielectric layer configured to support and separate a flexion region of the diaphragm plate from an adjacent surface of the backing plate to enable deflection of the flexion region relative to the adjacent surface of the backing plate, a capacitance of the sensor structure varying as a function of an amount of the deflection of the flexion region; and
a sensing device coupled to the backing plate and a housing in which sensor structure is mounted, the sensing device configured to provide an output signal that represents pressure within the housing based on the capacitance of the sensor structure.

17. The system of claim 16, wherein the dielectric layer further comprises a layer of dielectric material disposed on at least one of the first surface of the diaphragm plate and the adjacent surface of the backing plate.

18. The system of claim 16, further comprising a press plate at the second surface of the diaphragm plate, the press plate including an aperture extending therethrough that is aligned to provide a path for fluid media to apply the force onto the flexion region of the diaphragm plate.

19. A method for making pressure sensor, comprising:
providing a diaphragm plate of an electrically conductive material, a predetermined region of the diaphragm plate defining a flexion region;
providing a layer of dielectric material along a proximal surface of the diaphragm plate except at the flexion region which is substantially free of the dielectric material;
mounting a backing structure comprising an electrically conductive material within a housing, the backing structure and the diaphragm plate sandwiching the layer of dielectric material within the housing in a configuration such that the layer of dielectric material supports the flexion region of the diaphragm plate to enable deflection thereof in response to pressure of fluid media provided at an inlet of the housing that is in fluid communication with a pressure-receiving distal surface of the diaphragm plate.

20. The method of claim 19, further comprising providing a press plate of an electrically conductive material, the press plate including, the press plate being mounted in the housing to engage the pressure-receiving distal surface of the diaphragm plate, an aperture of the press plate extending therethrough and aligned with the flexion region to provide for communication of the fluid media onto the flexion region.

21. A pressure sensor produced according to the method of claim 19.

* * * * *